United States Patent [19]
Marchetti

[11] 3,841,916
[45] Oct. 15, 1974

[54] METHOD OF RECLAIMING ELECTROLYTE FOR REUSE IN BATTERIES

[76] Inventor: Roland A. Marchetti, 2780 N. W. North River Dr., Miami, Fla. 33142

[22] Filed: Sept. 5, 1972

[21] Appl. No.: 286,599

[52] U.S. Cl.................. 136/165, 136/174, 210/513
[51] Int. Cl. ......................................... H01m 47/00
[58] Field of Search ............ 136/165, 174; 210/513

[56] References Cited
UNITED STATES PATENTS

| | | | |
|---|---|---|---|
| 2,250,490 | 7/1941 | Lormor............................ | 136/174 |
| 2,900,078 | 8/1959 | Federgreen et al................ | 210/513 |
| 2,977,007 | 3/1961 | Richardson et al................ | 136/174 |
| 3,453,150 | 7/1969 | Murph et al....................... | 136/174 |

*Primary Examiner*—Donald L. Walton
*Attorney, Agent, or Firm*—Salvatore G. Militana

[57] ABSTRACT

The method of reclaiming battery fluid from old batteries for use as electrolyte in new batteries whereby the old batteries are placed on a tilted tray and the tops are sheared off. The battery fluid is permitted to spill into a stainless steel trough and drained off into a trap wherein the particles of lead, plastic, etc. are removed therefrom. The fluid is then drained off through plastic pipes to a lead lined tank and permitted to remain there for a period of approximately 24 hours when the fluid is pumped therefrom leaving the settled and floating impurities in the tank. This fluid is then brought up to a predetermined strength upon the addition of concentrated sulfuric acid. After a cooling period of 36 hours the fluid is passed through fiberglass filters and stored for use as electrolyte in new batteries.

2 Claims, No Drawings

METHOD OF RECLAIMING ELECTROLYTE FOR REUSE IN BATTERIES

BACKGROUND OF THE INVENTION

1. Field of the Invention

The present invention is directed to the method of reclaiming electrolyte from old batteries for reuse in new batteries.

2. Description of the Prior Art

At the present time the electrolyte of old and non-usable batteries which number many millions each year is not reclaimed but merely disposed by dumping into the earth. The handlers of old batteries are interested only in the reclaiming of the lead while the remainder of the battery including the electrolyte is deemed worthless and disposed of in any way possible to rid themselves thereof. By spilling the electrolyte on the earth, irrevocable damage is done to the earth. The electrolyte not only pollutes the earth, but destroys all organic matter and all manner of insect and animal life therein, and reacts chemically with any metals in the earth. In addition, the water that percolates therethrough becomes poisonous to animals as well as to mankind. Consequently, the only way in which the used electrolyte can be disposed is by diluting the electrolyte to an innocuous condition with water. However, it would require a tremendous amount of water to dilute the electrolyte being disposed by dumping water that is already in scarcity making this method of disposing electrolyte from old batteries as undesirable.

It is obvious that the disposing of the used electrolyte by dumping is a wasteful act resulting in a loss of the liquid which though in a diluted and less than useful concentration can be reprocessed to be useful by a simple method of reclaiming the electrolyte in a manner that is profitable to all concerned as well as preventing the above indicated pollution and contamination of man's ecology.

SUMMARY OF THE INVENTION

The present invention contemplates the conservation of electrolyte taken from old storage batteries and reclaiming the electrolyte so as to make it reusable in new batteries, thereby preventing contamination of the earth and water that results in harm to mankind, animals, and plant life.

Therefore, the primary object of the present invention is to provide a method of reclaiming electrolyte from old batteries so that the electrolyte is not disposed of in a manner resulting in pollution of the earth but instead is returned back into usable electrolyte.

Another object of the present invention is to provide a method of reclaiming and reusing electrolyte from old batteries that will result in a profitable operation to the person this engaged thereby enhancing the incentive to reclaim lead and other useful parts of old and wornout batteries.

A further object of the present invention is to provide a method of reclaiming and reusing electrolyte taken from old batteries, wherein the reclaimed electrolyte is brought up to usable strength by simply adding concentrated sulfuric acid thereto, and thereby avoiding the present manner of adding water to concentrated sulfuric acid that results in a chemical reaction giving off considerable heat that requires a cooling off period before being added to new batteries.

DESCRIPTION OF THE PREFERRED METHOD

Since batteries of the lead-acid type have a relatively short life in comparison to an automobile or the powered equipment of which it is a part, the number of such old and useless batteries is tremendous which must be disposed of. At present in order to be able to reclaim the lead in the old batteries, the electrolyte is dumped directly on the earth or diluted with water and then disposed in a body of water or into the earth that results in contamination of the earth and water and danger to animal and plant life. In the present method of reclaiming the electrolyte of old batteries, the top of the batteries is sheared off while lying on a tilted tray to permit the acid to flow into a stainless steel trough where the acid is collected and the metal particles and the like settle and are trapped while the electrolyte is permitted to overflow through plastic pipes to a lead lined tank.

The battery fluid or electrolyte is compelled to settle and remain in the lead lined tank for at least twenty-four hours whereby the heavier than water particles and impurities are permitted to settle to the bottom while the lighter than water impurities such as grease, dirt, etc. float at the top of the tank of battery fluid. An outlet to which a pump is connected is positioned approximately ten inches from the bottom of the tank. The pump is permitted to evacuate electrolyte through this outlet until the top of the level of the electrolyte or battery fluid has dropped to within ten inches from the outlet so that neither the settled nor the floating impurities are pumped from the tank.

The more or less pure battery fluid is then pumped through a plastic pipe to a second lead lined tank where pure concentrated sulfuric acid is added thereto to bring up the strength of the electrolyte to its proper gravity reading. After approximately thirty-six hours later, during which time the electrolyte cools off to a temperature permitted for further handling, the mixture if filtered through fiberglass filters to remove the smaller particles of foreign matter, if any are present therein, and then pumped through a plastic pipe into plastic lined containers that are stored and later delivered to dealers who sell batteries. The latter are normally maintained in a dry condition until sold when the dealer then fills the new storage batteries with electrolyte of proper concentration. The remainder of the materials forming the old storage battery is reclaimed for its lead, other metals and oxides found therein as well as the plastic case which is ground into fine particles and used as fill in the earth.

From the above discussion, it can be readily noted that the present method for reclaiming old battery fluid for use as electrolyte in new batteries is extremely simple in execution and inexpensive cost, yet resulting in a profitable enterprise in that the sale of the reclaimed battery fluid and the other lead and other metals returns a profit over the cost of carrying out of the process. Beyond the profit motive there is the need for preventing the pollution caused by the spilling of the battery fluid on the ground that virtually corrupts the earth and water for any use whatsoever along with the danger to animal and insect life as well as to human life. Last but not least, the use of reclaimed battery fluid shortens the cooling period when concentrated sulfuric acid is added to bring the former up to required strength. In the present method if ordinary water is used, the metals in the water react over a period of time with the concentrated sulfuric acid to create considerable heat that must be dispelled before packaging. To use distilled water instead may reduce the cooling off period but brings up the cost of the electrolyte considerably.

Having disclosed my invention, what I claim as new and desire to secure by Letters Patent of the United States is:

1. The method of reclaiming battery fluid from old batteries for use as electrolyte for new batteries comprising the steps of collecting said battery fluid into a settling tank that is impervious to sulfuric acid, permitting the settling of said fluid for a period not less than twenty-four hours, pumping only a portion of said fluid from a position above the bottom of said tank whereby those impurities that are heavier than the fluid and those that are floating thereon remain in said settling tank and only the relatively clear fluid is collected in a second tank impervious to sulfuric acid, the adding of concentrated sulfuric acid to said fluid whereby said fluid is brought up to a predetermined strength for use in new storage batteries, permitting the cooling of said fluid over a period of substantially thirty-six hours and filtering said cooled fluid thereby readying said fluid as electrolyte for use in new batteries.

2. The method as recited by claim 1 wherein said old batteries are positioned on a tilted tray as their tops are sheared permitting said battery fluid to spill into a trough for draining into said settling tank.

* * * * *